US006175836B1

(12) United States Patent
Aldred

(10) Patent No.: US 6,175,836 B1
(45) Date of Patent: Jan. 16, 2001

(54) OPTIMIZATION OF RELATIONAL DATABASE QUERIES

(75) Inventor: Barry Keith Aldred, Winchester (GB)

(73) Assignee: International Business Machines Corporation, Armonk, NY (US)

(*) Notice: Under 35 U.S.C. 154(b), the term of this patent shall be extended for 0 days.

(21) Appl. No.: 09/073,804

(22) Filed: May 6, 1998

(30) Foreign Application Priority Data

Oct. 9, 1997 (GB) .................................................. 9721327

(51) Int. Cl.⁷ ...................................................... G06F 17/00
(52) U.S. Cl. ............................... 707/103; 707/2; 711/171
(58) Field of Search .................................... 707/102, 103, 707/104, 2; 711/171

(56) References Cited

U.S. PATENT DOCUMENTS 5,276,870 * 1/1994 Shan et al. ................................. 707/2
5,675,785 * 10/1997 Hall et al. .............................. 707/102
5,701,453 * 12/1997 Maloney et al. .......................... 707/2

* cited by examiner

Primary Examiner—Hosain T. Alam
Assistant Examiner—Jean Bolte Fleurantin
(74) Attorney, Agent, or Firm—David M. Shofi; Anne Vachon Dougherty

(57) ABSTRACT

A data retrieval system stores a plurality of objects having a multi-level hierarchical relationship, each object having a respective parent and a set of children. The system stores one or more base tables, the or each base table comprising a respective set of attributes associated with a sub-set of objects in the system, and generates for the or each base table a respective complementary table, the or each complementary table comprising a set of attributes excluding the attributes of the associated base table. The system further includes an expression optimiser adapted to interpret a query comprising an expression including one or more operations, each operation having a respective operator and one or more associated operands. The optimser tracks a number of objects associated with the or each operation and any attributes associated with the operation; and re-formulates the expression accordingly.

23 Claims, 3 Drawing Sheets

SCHEMA OBJECT

OBJECT CLASS DEFINITIONS

| CLASS | ATTRIBUTES |
|---|---|
| TOP | M: objectClass |
| ORGANIZATION | M: orgName, CEO<br>O: sharePrice |
| SITE | M: siteName |
| PRODUCT | M: prodName, PRICE |
| EMPLOYEE | M: emplName, ID<br>O: INIT |
| SCHEMA | M: SCHEMA |

| PARENT | CHILD |
|---|---|
|  | TOP |
| TOP | ORGANIZATION |
| TOP | SITE |
| TOP | PRODUCT |
| TOP | EMPLOYEE |
| TOP | SCHEMA |

STRUCTURAL RULES

| PARENT | ALLOWED CLASS OF CHILDREN | NAMING ATTRIBUTES |
|---|---|---|
| ROOT | SCHEMA | objectClass |
| ROOT | ORGANIZATION | orgName |
| ORGANIZATION | SITE | siteName |
| ORGANIZATION | PRODUCT | prodName |
| SITE | EMPLOYEE | emplName |
| SITE | EMPLOYEE | ID |
| SITE | EMPLOYEE | INIT+ID |

FIG.2

OPTIMIZATION OF RELATIONAL DATABASE QUERIES

FIELD OF THE INVENTION

The present invention relates to a data retrieval system and methods of optimising access to the system.

BACKGROUND OF THE INVENTION

LDAP (lightweight directory access protocol) has been adapted as an Internet standard. An LDAP directory of the known type comprises a collection of hierarchically related objects, an example of which is shown in FIG. 1. The structure of the directory and content of its objects are typically determined by the contents of a schema object which is normally itself stored in the directory. The contents of this schema object comprise a set of object class definitions and a set of structural rules, as shown for the above example in FIG. 2. The class definitions include a) a list of both mandatory (M) and optional (O) attributes for each object class allowed in the directory; and b) a list defining the hierarchical relationships between object classes and hence the inheritance rules for class definitions. In the above example, all object classes other than top are subclasses of the class top, thus inheriting the attribute objectclass.

The structural rules control the arrangement of objects in the directory hierarchy and comprise a list of the allowed child object classes to each parent class and, for each such combination, the naming attribute(s) to be used to provide a unique relative distinguished name (RDN) for such an object.

The relative distinguished name (RDN) provides a unique name for an object at that point in the directory hierarchy. Its format is thus somewhat unpredictable for any object, as it is formed by a combination of one or more of the object's attributes and as can be seen from the naming attributes for employees, many different attributes may be used for an object at any one point in the tree. LDAP objects also have a unique name in the directory—the distinguished name (DN). The DN is formed by the successive, sequential concatenation of the RDNs of the object itself and its parents, back up to the root of the directory tree.

For reasons of economy, scaleability, robustness and performance, it is now becoming accepted that existing relational database products (DB2, Oracle etc.) be used for the LDAP backing store. This requires that the hierarchical directory data model be mapped into the tabular model of relational databases. (The LDAP directory model is based on X.500 although, the precise nature of the X.500 to relational database mapping is not important to this disclosure; many possibilities exist and the details are complex.) Similarly, LDAP protocol operations need to be mapped into the relational operations supported by SQL. However it also desirable that the directory data be available for ad-hoc queries, expressed directly in SQL.

It can be seen that the directory of FIG. 1 contains objects with varying type of attributes. If a single table or relation is used to store all the objects, then most objects will have many null attributes, making inefficient use of storage. Thus, a relational database typically comprises one or more base relation(s), each comprising a plurality of objects which in turn includes one or more attributes. A universal relation is essentially a union of all of the information in the base relations in the database. If the universal relation is substantiated for every query, when the query may only require substantiation of a sub-set of base relations, then memory and processing power will be wasted. On the other hand requiring that the base relations used for directory storage should be understood by users, makes query formulation unduly difficult.

DISCLOSURE OF THE INVENTION

Accordingly, the present invention provides a data retrieval system in which a plurality of objects having a multi-level hierarchical relationship are stored, each object having a respective parent and a set of children, said system including:

means adapted to store one or more base tables, the or each base table comprising a respective set of attributes associated with a sub-set of objects in the system, means adapted to generate for the or each base table a respective complementary table, the or each complementary table comprising a set of attributes excluding the attributes of the associated base table, and optimisation means adapted to interpret a query comprising an expression including one or more operations, each operation having a respective operator and one or more associated operands; to track a number of objects associated with the or each operation and any attributes associated with the operation; and to re-formulate the expression accordingly.

In a further aspect, the invention is implemented in a computer program product comprising computer readable program code stored on a computer readable recording medium, the program code including a data retrieval system in which a plurality of objects having a multi-level hierarchical relationship are stored, each object having a respective parent and a set of children, said system including: means adapted to store one or more base tables, the or each base table comprising a respective set of attributes associated with a sub-set of objects in the system, means adapted to generate for the or each base table a respective complementary table, the or each complementary table comprising a set of attributes excluding the attributes of the associated base table, and optimisation means adapted to interpret a query comprising an expression including one or more operations, each operation having a respective operator and one or more associated operands; to track a number of objects associated with the or each operation and any attributes associated with the operation; and to re-formulate the expression accordingly.

The present embodiment employs the universal relation as an access model for a hierarchical directory stored in a plurality of relations in a relational database.

BRIEF DESCRIPTIONS OF THE DRAWINGS

FIG. 2 is a conventional schema for the LDAP directory of FIG. 1;

DESCRIPTION OF THE PREFERRED EMBODIMENT

Figure 1:
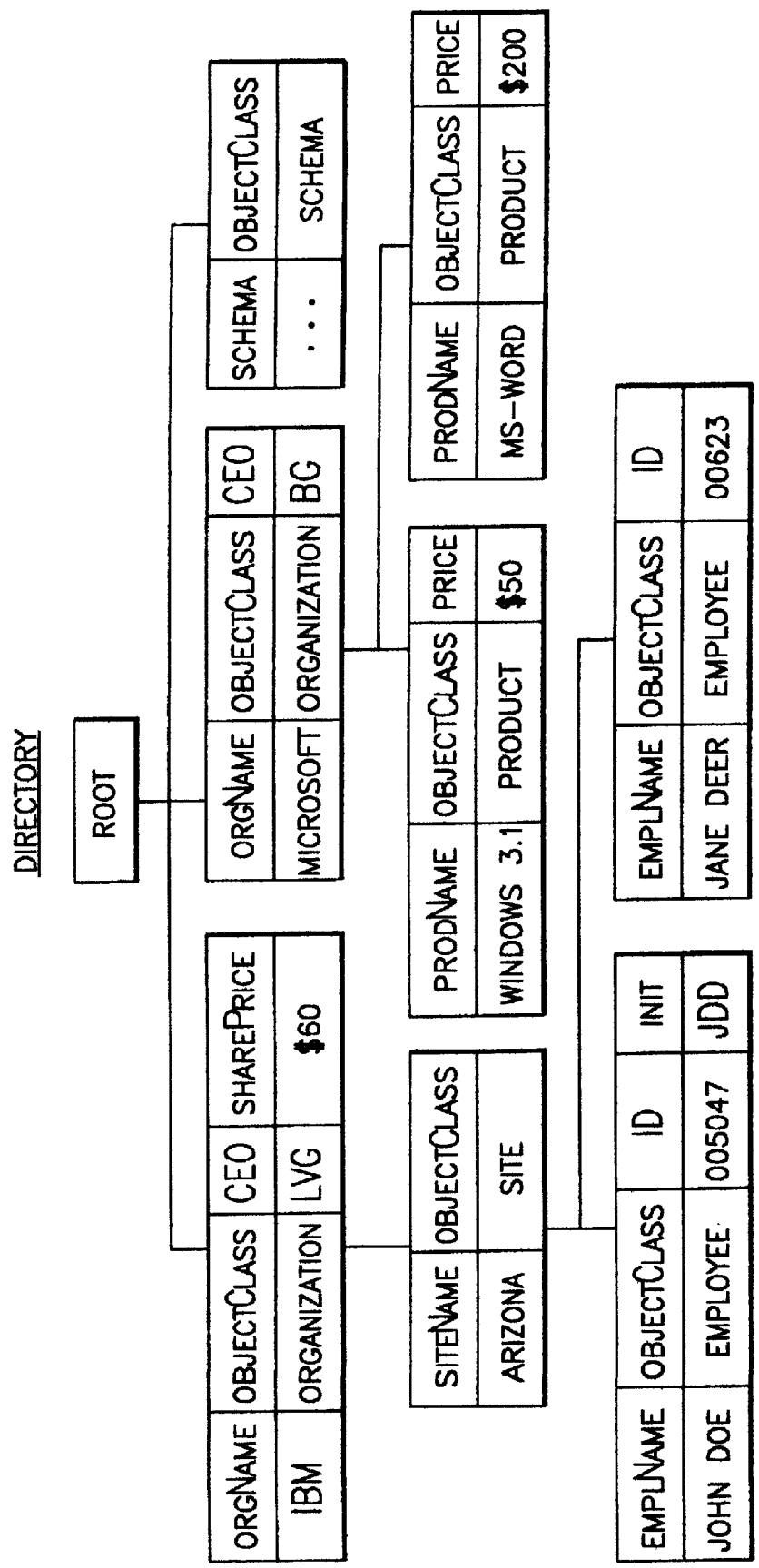
FIG. 1 is a diagram illustrating a conventional LDAP directory.
Figure 3:
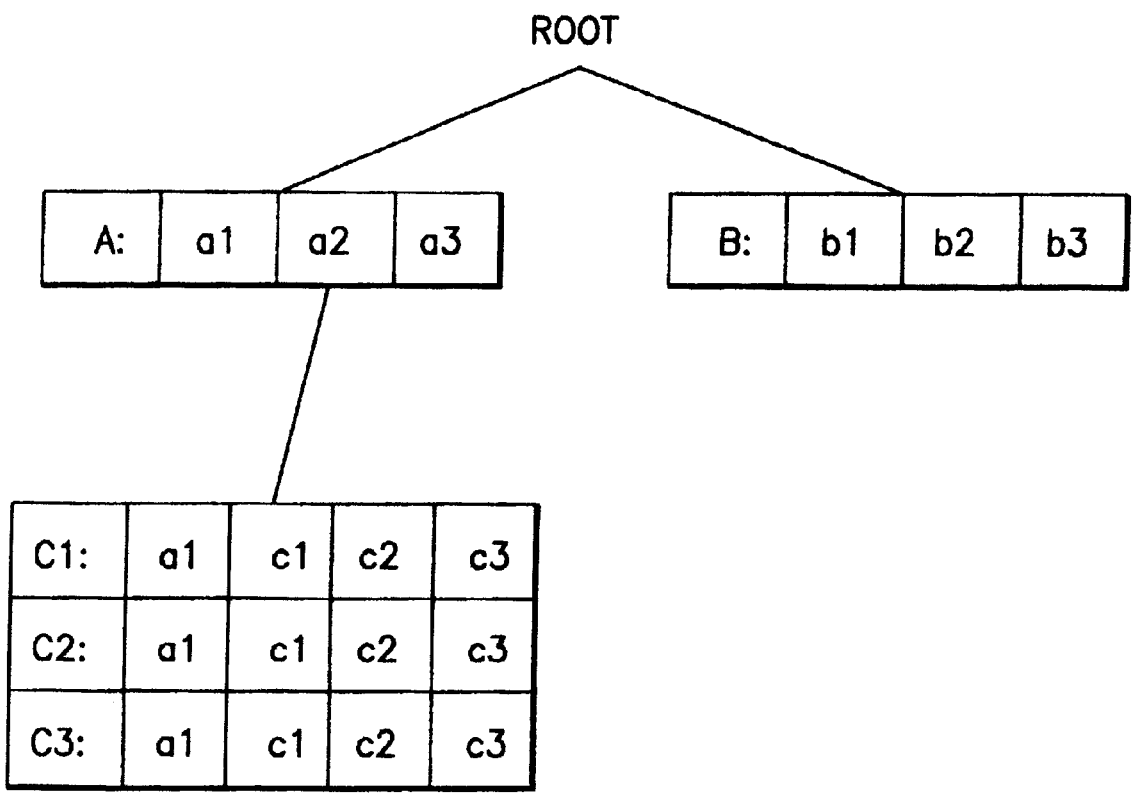
FIG. 3 is a directory tree where A, B and C1–C3 are objects in the directory tree.

In relation to FIG. 3, A and B have the root of the tree as their parent; C1–C3 have object A as their parent. Objects A and B have attributes a1–a3 and b1–b3 respectively; objects C1 C3 each have attributes a1 and c1–c3. For the purposes of this example it is also assumed that attributes a1, b1 and c1 hold a unique identifier for their respective objects, i.e. A, B and C1–C3. Thus the attribute a1 of C1–C3 relates these objects to their parent A.

One useful table mapping is suggested immediately by the table structure, i.e. three object tables as below:

TA: ta1, ta2, ta3
TB: tb1, tb2, tb3
TC: ta1, tc1, tc2, tc3 where TA, TB and TC hold the objects (tuples) at the nodes in the tree, i.e. TA and TB each hold just objects A and B in this case, and TC holds objects C1–C3. The column names ta1, ta2 etc. hold the correspondingly named attributes a1, a2 etc.

These three base tables represent an efficient relational database representation of the directory contents. However although simple, they are unsuited for generalised query because they expose the directory structure, in the sense that the tree has become fragmented into three tables. The way that the tables combine to reconstruct the information content of the original is not obvious in the general case. Even when it can be deduced, the reconstruction (full or partial) must be added to the query logic.

A solution to the problem is to define the universal relation, which as explained earlier is essentially a single view of the directory, with a column for every attribute present in the directory and a row for each object (In this simplification many aspects have been omitted for simplicity, e.g. naming clashes, multi-valued attributes, optional attributes, relationship to object classes and so on). The construction of the universal relation can be most easily appreciated by considering it as a three-stage process:

Stage 1: A new set of base tables is created such that all objects now also include the attributes and values of all their antecedents. In the example above, this only affects table TC which is extended to include columns a2 and a3. In general the base object tables previously proposed are joined with their ancestors up the tree. This new set of base tables will be called extended base tables and in the example, will be denoted by TeA, TeB and TeC.

Stage 2: For each extended base table a complementary table is defined that contains all the attributes not present in the extended base table. Each such complementary table contains a single entry with null values for each attribute. In the example, these complementary tables and their attributes are:

TcA: b1, b2, b3, c1, c2, c3;
TcB: a1, a2, a3, c1, c2,c3; and
TcC: b1, b2, b3.

Stage 3: To create the view, each extended base table is multiplied by its complementary table; the universal relation is then the union of these results.

In the example the universal relation has attributes a1–a3, b1–b3 and c1–c3 with five rows, one for each object. If substantiated, such a table, where columns in the table representing attributes not possessed by that object have a null value, would be suited to ad-hoc query because it alone represents the directory and has all the objects pre-associated with their ancestors up the tree.

In the present invention, the universal relation is, however, only established as a view on the base relations, i.e. it will not exist as an explicit set of rows in the relational database (since it is in general far too large to store in this way).

Ad-hoc queries on the directory are formulated as relational expressions on the universal relation. It is important, however, to emphasise that in the evaluation of these expressions, the universal relation does not get substantiated.

From a relational database viewpoint, the directory application is unusual in that the universal relation used in the query has the general structure of a union of many tables, each of which is multiplied with a complementary relation which has a single entry of all null values. Although conventional relational databases include optimisers to improve query responsiveness, these optimisers have no special provision for this case. However, it is crucial to achieving acceptable query performance that the unusual properties of these complementary tables are taken into account.

The data retrieval system of the present invention enables optimisation of relational expressions, by transforming a supplied expression into one which is faster (less resource consuming, etc.) to evaluate. An important part of the optimisation is to eliminate unnecessary operations and possibly re-order others; this results in the elimination of certain base relations from an expression, where possible.

In order to explain the optimisation process, it is necessary to explain the syntax of a relational expression. For simplicity, the present description is expressed in the relational algebra employing a notation defined by C. J. Date in "An Introduction to Database Systems". Examples of operators in this notation are (syntax is provided where this is not the same as the operator):

union: creates a relation consisting of all the objects appearing in either operand relation intersect: creates a relation consisting of all the objects appearing in both operand relations difference: creates a relation consisting of all the objects appearing in one operand relation but not in the other operand product: creates a relation consisting of all the possible combinations of objects taken from each operand relation, (syntax: * or TIMES).

division: is the inverse of the product operation project: restricts a relation to a specified list of attributes, (syntax: [ ]).

restrict: restricts a relation to those objects that satisfy given criteria, (syntax: where).

join: is a synthetic operator representing a sequence of operations on operand relations. First common attributes are renamed in one relation, then a product of the relations is carried out, a restrict then eliminates objects from the resultant relation where initially common attributes differ, followed by a project to remove the renamed common attributes from the resultant relation.

delete: removes selected objects from a relation insert: is the inverse of delete update: changes the contents of attribute(s) of any selected objects in a relation.

Using the example of FIG. 3, a typical database query may be to retrieve the value of an attribute given a certain predicate. For example: List attribute c2 for the cases where c3>4. Using the above notation and assuming the universal relation is identified as V, a relational expression can be written as:

(V WHERE c3>4) [c2]

This expression is passed to the relational database, and given that the universal relation is defined by:

V=(TeA*TcA) UNION (TeB*TcB) UNION (TeC*TcC)

the query is expanded to the expression below:

(((TeA*TcA) UNION (TeB*TcB) UNION (TeC*TcC))

where c3>4) [c2]

This expression can be executed, since it is now an expression involving just base tables. However, to do so without further transformation would involve the substantiation of the universal relation. An optimum form of the query for this example is:

(TeC where c3>4) [c2]

This is because the extended base tables TeA and TeB contribute nothing to the answer, nor do the complementary tables TcA, TcB and TcC.

The optimisation process enabled by the present invention:

1. Tracks the origin of columns through the pseudo-evaluation of the expression, in particular being aware of which columns have arisen only from complementary tables; and
2. Tracks the cardinality (number of objects) of the tables, again through the pseudo-evaluation of the expression.

Although these two techniques are described independently below, in practice they are simultaneously applied.

Column tracking and actions

Conventionally, expressions are evaluated by parsing the complete expression to find where it can be split into an operator and two self-contained operands. The operator is then pushed onto a stack, whilst the two operands are recursively parsed in turn, repeating the process. When an operand is no longer an expression (but a table) then this too is pushed on to the stack. When parsing is complete, execution begins by popping the operands off the stack until an operator is found; the popped operands are then the operands of that operator. The operator is evaluated and the result pushed back onto the stack. The process continues until the stack comprises a single value, which is the result of the original expression.

In the case of optimisation, a pseudo-evaluation takes place. The operations are not actually evaluated to get the actual result; instead the nature of the result is determined. This is sufficient to allow the pseudo-execution to continue. Based on an understanding of these intermediates, many operations involving them can be eliminated.

The origin of columns is tracked by the use of a parallel stack, synchronised with the main stack described above. The parallel stack, for each operand, maintains a list of those columns whose values are known to be entirely null (or non-existent). In the pseudo-evaluation, nulls are pushed on to this parallel stack, except when a table operand is a complementary table. In this case all the column names are pushed onto the stack instead. When operators are evaluated, only those columns of the result that are null have their names saved on the parallel stack.

Knowing the column origin allows assumptions to be made on the cardinality (see below) which can then be used to optimise the operations.

Cardinality tracking and actions

In an analogous manner a second parallel stack is maintained to keep track of the cardinality of operands. This cardinality is not the true cardinality because the real operations are not being evaluated; instead only the following situations are distinguished:

Cardinality zero (zc): the table has no entries
Cardinality null (scn): defined as the table having a single all null entry
Cardinality real (rc): the table has an indeterminate number of entries, about which nothing is known.

Initially, all non-complementary tables are assumed a real cardinality; complementary tables are known to have a null cardinality.

Optimisation Rules

The rules to be used in the optimisation are as detailed below. Application of the rules is an iterative process where each rule is considered in turn and applied if relevant; after one rule has been applied, the full set of rules is then to be re-considered in sequence. Optimisation is complete when no further rules are applicable.

The proposed rules, in their order of consideration, are:

Rule 1. If one of the parameters of a product or join operation is a relation of zero degree (a relation with no attributes), or an expression that results in a relation of zero degree, then that relation (or expression) and the associated product or join operation is eliminated. For example, if B is a relation of zero degree, then:

A TIMES B becomes A

Rule 2. If one of the parameters of a selected operation is either (a) a relation with zero cardinality (a zc relation)—or an expression that results in a relation with zero cardinality, or
(b) a relation which is either a zc relation or has single cardinality with all of its values null (an scn relation), then specific optimisations are sometimes possible. The precise rules are:

zc status trivially arises from the:

union of two zc operands;

intersection of two operands one of which has zc;

subtraction operation between two identical operations;

subtraction of any operand from a zc operand;

division of or by a zc operand;

product or join by a zc operand;

restriction on a zc with any filter or on an scn with a 'real' filter.

scn status arises from the:

union of two scn operands or one scn and one zc operand;

intersection involving an scn operand;

subtraction of a non-scn operand from an scn operand;

division of an scn operand;

product or join of two scn operands.

Operation removal union: an operand with itself (replace with one operand);

if either operand is a zc operand (replace with the other operand);

if both operands are scn (replace with one scn);

if one operand is an scn and the other is neither an scn nor a zc operand, then replace with that other operand.

intersect: an operand with itself (replace with one operand);

one operand is a zc operand (replace with the zc operand);

one operand is a scn (replace with the scn). difference: an operand with itself (replace with a zc);

the first or second operand has zero cardinality (replace with the first operand).

divide: an operand by itself (replace with the first operand);

the first/last operand is a zc operand (replace with a zc operand); both operands are scn operands (replace with an scn operand).

restrict: the operand is a zc (replace with a zc);

the operand is an scn and the filter selects 'real' entries (replace with a zc);

the operand is an scn and the filter selects 'non-real', entries (replace with an scn).

delete: the operand is a zc (replace with a zc);

the operand is an scn (replace with an scn).

product: if either operand is a zc operand then the result is a null operand with the sum of the attributes of the constituent operands.

join: an operand with itself (replace with one operand); if either operand is a zc operand then the result is a null operand with the sum of the unique attributes of the constituent operands.

project: if the operand is a zc operand, the result is a null operand with the attributes of the project.

For example, if B is a relation of zero cardinality, then:

A UNION B becomes A

A INTERSECT B becomes B

A DIFFERENCE B becomes A

In all cases there is no distinction made between a relation or a relational expression; this therefore requires that equivalent relational expressions can be identified even when they are differently specified. For example, trivially A UNION B is identical to B UNION A; many more complex examples exist. The equivalence of sub-trees needs to established without execution of the expressions.

The knowledge that certain attributes arising from zc or scn relations is also maintained by the optimiser through algebraic operations. This allows a subsequent projection operation specifying only such attributes to be identified as such a relation - this is important in not losing information through, for example, a join of an scn relation with a normal relation.

Rule 3. Restrictions are sub-divided where possible in order to minimise attribute coupling, e.g.

A WHERE (A1=X and A2=Y) becomes (A WHERE (A1=X)) WHERE (A2=Y)

A WHERE (A1=X or A2=Y) becomes (A WHERE (A1=X)) UNION (A WHERE (A2=Y))

Rule 4. Projections, restrictions, renames, updates, extends, inserts and deletes, are moved forward unchanged through unions, intersections and differences, e.g.

(A UNION B) [A1, A2] becomes (A [A1, A2]) UNION (B [A1, A2])

(A UNION B) WHERE (A1=X AND A2=Y) becomes (A WHERE (A1=X AND A2=Y)) UNION (B WHERE (A1=X AND A2=Y))

Rule 5. Restrictions and renames immediately following a product or join between two relations are re-cast, where possible, as operations on the constituents of the product or join. The filter list or rename list is split according to the attributes present in the constituent relations, e.g. assume relations A (A1, A2, A3) and B (A1, A2, B1, B2), then:

(A TIMES B) RENAME A1 AS A4 becomes (A RENAME A1 AS A4) TIMES (B RENAME A1 AS A4)

(A TIMES B) WHERE (A3=X) becomes (A WHERE (A3=X)) TIMES B

In certain restrictions it may not be possible to split the filter list and, if so, the optimisation cannot be applied.

Rule 6. Projections on a relation that include new attribute(s) not present in that relation, are transformed to include prior relational product(s) with 'new attribute' relation(s) with the same name(s) as the new attribute(s), e.g. assume a relation A (A1, A2, A3), then if A4 represents a new attribute: A[A1, A2, A3, A4] becomes (A TIMES A4) [A1, A2, A3, A4]

Rule 7. The union of a sequence of update (or rename, extend, insert or delete) operations, is transformed into individual update (or rename, extend, insert or delete) operations, e.g. assume relations A (A1, A2, A3) and B (A1, A2, A3), then:

(UPDATE A WHERE (A1=X AND A2=Y) (A3 :=X))
UNION
(UPDATE B WHERE (A1=X AND A2=Y) (A3 :=X))
becomes

UPDATE A WHERE (A1=X AND A2=Y) (A3 :=X)

UPDATE B WHERE (A1=X AND A2=Y) (A3 :=X)

Rule 8. Expressions in update (or rename, extend, insert or delete) operations comprising products of a single base relation with one or more 'new attribute' relations, are transformed into a prior assignment statement to that base relation, e.g. assume a base relation A (A1, A2, A3) and 'new attribute' relation B then:

UPDATE (A TIMES B) WHERE (A1=X AND A2=Y) (A3:=X) becomes

A:=A TIMES B

UPDATE A WHERE (A1=X AND A2=Y) (A3:=X)

Rule 9. In all expressions the attributes that must be present for all intermediates to generate the final result are calculated. For:

(a) a project operation the attributes specified are replaced by the minimum necessary set, and (b) immediately after each relation is inserted a project operation that retains only the minimum attributes. e.g. assuming a relation A (A1, A2, A3, A4):

(A WHERE (A1=X AND A2=Y)) [A1, A3] becomes ((A [A1, A2, A3]) WHERE (A1=X AND A2=Y)) [A1, A3] (A RENAME A1 AS B1) [A2, B1, A3] becomes ((A [A1, A2, A3]) RENAME A1 AS B1) [A2, B1, A3]

Rule 10. Consecutive projections on a relation are eliminated by removing all but the last projection, e.g. assume a relation A (A1, A2, A3), then: (A [A1, A2, A3]) [A2, A3] becomes A [A2, A3]

Redundant projections are also removed, i.e. those that specify all the attributes of a relation or intermediate.

Rule 11. Occurrences of the view relation are substituted with the equivalent expressions involving the base relations.

Rule 12. Consecutive restrictions on a relation are combined, e.g. assume a relation A (A1, A2, A3), then:

(A WHERE (A1=X)) WHERE (A2=Y) becomes A WHERE (A1=X AND A2=Y)

None of the rules above will adversely affect any arbitrary relational query operation that does not involve directory data.

Rule 1 allows simplification of many expressions and is important because relations of zero degree often arise from the action of other rules on the expansion of the view relation. Rule 2 likewise exploits the properties of the complementary directory relations and the effects of other rules and operations upon them. Rule 3 is present to allow sub-division of restrictions such that maximum exploitation can be made of them in rule 5. Rule 4 is present to allow user specified operations to trickle down to the expansion of the view relation, as is rule 5. Rules 6 to 8 are peculiar to update processing and allow base directory relations to be updated through operations expressed on the view relation. Rule 9 ensures that the minimum subset of the database is used where possible. Rules 10 and 12 attempt to mitigate harmful effects of optimisation by eliminating operations introduced through the other rules. Rule 11 is the important substitution of the view relation.

Rule sequencing

Application of the rules is an iterative process where each rule is considered in turn and applied if relevant; in general, after one rule has been applied the full set of rules is then re-considered once more, in sequence from the start.

The rules fall into five categories:

Substitution: substituting expressions for relations (rule: 11)

Elimination: removing expressions that do not contribute to the result (rules: 1, 2, 10)

Fragmentation: breaking up an expression into more primitive sub components (rule: 3)

Sequencing: re-ordering and replacing operations (rules: 4 to 9)

Combination: building complex components from more primitive sub-components (rule:12)

To a first approximation, the order of consideration of the rules matches this analysis; substitution expands the query introducing new operations; elimination is then performed to simply the resulting expression; fragmentation prepares the result for the other rules; sequencing applies the main elements of optimisation, pushing down sub-setting operations to the base relations. The combination rules are performed last, simplifying the query by the joining together of primitive operations.

In practice, however, it has been found beneficial to defer substitution until after sequencing; although the results are the same the algorithm operates more efficiently. The technique allows the base query (as specified by the user) to be simplified first, before a second such phase takes place on the expanded query. The rule order suggested previously is not critical to the algorithm and various other sequences also provide valuable optimisation.

It is expensive to consider all the rules in sequence all of the time—many of the rules involve much processing. It will be seen that rule control can be introduced in which a history is maintained for each rule showing what else has been applied since that rule was itself last invoked.

Most of the rules above depend upon a subset of the other rules having been applied for them to have further effect on a subsequent pass; other rules should (in some cases must) be applied only once (e.g. rules 3 and 11).

It will also be seen that other rules can be employed, for example, a join operation which is a synthetic operation made up of a number of simpler operations could advantageously be broken down into it sequence of simpler operations, thus allowing for possible optimisation of these simpler operations. Thus, assuming relations: A(A1, A2, A3) and B(A1, A2, B1, B2), then:

A JOIN B becomes (((A RENAME A1 AS X1, A2 AS X2) TIMES B)

where (A1=X1 and A2=X2)) [A1, A2, A3, B1, B2]

What is claimed is:

1. A data retrieval system in which a plurality of objects having a multi-level hierarchical relationship are stored, each object having a respective parent and a set of children, said system including:

means adapted to store one or more base tables, each base table comprising a respective set of attributes associated with a sub-set of objects in the system;

means adapted to generate for each base table a respective complementary table, the complementary table comprising a set of attributes excluding the attributes of the associated base table and having a null cardinality; and optimisation means adapted to interpret a query comprising an expression including one or more operations, each operation having a respective operator and one or more associated operands; to track a number of objects associated with each operation and any attributes associated with the operation; and to reformulate the expression accordingly.

2. A data retrieval system as claimed in claim 1 comprising means adapted to extend each base table to include any attributes of any parents of each base table.

3. A data retrieval system as claimed in claim 2 comprising means adapted to generate a universal view, said view comprising a union of one or more products of each extended base table and its corresponding complementary table.

4. A data retrieval system as claimed in claim 1, wherein said optimisation means is adapted to identify in an expression a product or a join operator and a pair of operands, one of said operands being a relation with no attributes, and to re-formulate the expression to delete the operator and the one operand.

5. A data retrieval system as claimed in claim 1, wherein said optimisation means is adapted to identify in an expression an operator and a pair of operands, one of said operands being of zero cardinality, and to re-formulate the expression to delete the operator and the operand of zero cardinality.

6. A data retrieval system as claimed in claim 1, wherein said optimisation means is adapted to identify in an expression a restrict, said restrict including a plurality of parameters, and to re-formulate the expression to divide said restrict into a plurality of restricts, each including one parameter.

7. A data retrieval system as claimed in claim 1, wherein said optimisation means is adapted to identify in an expression a restrict following a join operation having a pair of join operands, and to re-formulate the expression to apply the restrict to the respective join operands separately.

8. A data retrieval system as claimed in claim 1, wherein said optimisation means is adapted to identify in an expression consecutive projects, and to re-formulate the expression to retain only the last project.

9. A data retrieval system as claimed in claim 1, wherein said optimisation means is adapted to identify in an expression a universal view operator, and to re-formulate the expression to replace the universal view operator with an expression comprising a product of each base table and its corresponding complementary table and a union of each said product.

10. A data retrieval system as claimed in claim 1, wherein said optimisation means is adapted to identify in an expression a plurality of consecutive restricts each with one or more associated parameters, and to re-formulate the expression to combine said restricts into one restrict having all of said parameters.

11. A data retrieval system as claimed in claim 1, wherein said optimisation means is adapted to identify in an expression a join operator and a pair of join operands, said operands comprising tables having respective sets of attributes, and to re-formulate the expression to:

rename any attributes of one operand synonymous with attributes of said other operand;

replace the join operator with a product operator;

restrict the product operation to objects where any renamed attributes of the said one operand and any previously synonymous attributes of said other operand match; and project the expression to remove any renamed attributes of the said one operand.

12. A computer program product comprising computer readable program code stored on a computer readable recording medium, the program code including a data retrieval system in which a plurality of objects having a multi-level hierarchical relationship are stored, each object having a respective parent and a set of children, said system including: means adapted to store one or more base tables, each base table comprising a respective set of attributes associated with a sub-set of objects in the system, means adapted to generate for each base table a respective complementary table, the complementary table comprising a set of attributes excluding the attributes of the associated base table and having a null cardinality, and optimisation means adapted to interpret a query comprising an expression including one or more operations, each operation having a respective operator and one or more associated operands; to track a number of objects associated with each operation and any attributes associated with the operation; and to reformulate the expression accordingly.

13. A method for optimizing access to a data retrieval system, said data retrieval system comprising a plurality of objects having a multi-level hierarchical relationship, each object having a respective parent and a set of children, comprising the steps of:

storing one or more base tables, each base table comprising a respective set of attributes associated with a sub-set of objects in the system;

generating for each base table a respective complementary table, the complementary table comprising a set of attributes excluding the attributes of the associated base table and having a null cardinality;

interpreting a query comprising an expression including one or more operations, each operation having a respective operator and one or more associated operands;

tracking a number of objects associated with each operation and any attributes associated with the operation; and reformulating the expression accordingly.

14. The method of claim 13, further comprising extending each base table to include any attributes of any parent of each base table.

15. The method of claim 13 further comprising generating a universal view, said view comprising a union of one or more products of each extended base table and its corresponding complementary table.

16. The method of claim 13 further comprising identifying in an expression a product or a join operator and a pair of operands, one of said operands being a relation with no attributes and wherein said reformulating comprises reformulating the expression to delete the operator and the one operand.

17. The method of claim 13 further comprising identifying in an expression an operator and a pair of operands, one of said operands being of zero cardinality, and wherein said reformulating comprises reformulating the expression to delete the operator and the operand of zero cardinality.

18. The method of claim 13 further comprising identifying in an expression a restrict, said restrict including a plurality of parameters, and wherein said reformulating comprises reformulating the expression to divide said restrict into a plurality of restricts, each including one parameter.

19. The method of claim 13 further comprising identifying in an expression a restrict following a join operation having a pair of join operands, wherein said reformulating comprises reformulating the expression to apply the restrict to the respective join operands separately.

20. The method of claim 13 further comprising identifying in an expression consecutive projects and wherein said reformulating comprises reformulating the expression to retain only the last project.

21. The method of claim 13 further comprising identifying in an expression a universal view operator and wherein said reformulating comprises reformulating the expression to replace the universal view operator with an expression comprising a product of each base table and its corresponding complementary table and a union of each said product.

22. The method of claim 13 further comprising identifying in an expression a plurality of consecutive restricts each with one or more associated parameters and wherein said reformulating comprises reformulating the expression to combine said restricts into one restrict having all of said parameters.

23. The method of claim 13 further comprising identifying in an expression a join operator and a pair of join operands, said operands comprising tables having respective sets of attributes and wherein said reformulating comprises the steps of:

renaming any attributes of one operand synonymous with attributes of said other operand;

replacing the join operator with a product operator;

restricting the product operation to objects where any renamed attributes of the one operand and any previously synonymous attributes of said other operand match; and projecting the expression to remove any renamed attributes of the one operand.

* * * * *